(12) United States Patent
Dolganow et al.

(10) Patent No.: US 8,885,644 B2
(45) Date of Patent: Nov. 11, 2014

(54) COMPRESSED IP FLOW RECOGNITION FOR IN-LINE, INTEGRATED MOBILE DPI

(75) Inventors: Andrew Dolganow, Kanata (CA); Jason Rusmisel, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1230 days.

(21) Appl. No.: 12/071,982

(22) Filed: Feb. 28, 2008

(65) Prior Publication Data

US 2009/0219930 A1 Sep. 3, 2009

(51) Int. Cl.
 *H04L 12/28* (2006.01)
 *H04L 29/06* (2006.01)
 *H04L 12/24* (2006.01)

(52) U.S. Cl.
 CPC ............... *H04L 69/04* (2013.01); *H04L 69/22* (2013.01); *H04L 69/24* (2013.01); *H04L 41/509* (2013.01); *H04L 41/5087* (2013.01); *H04L 41/5003* (2013.01)
 USPC ............ 370/392; 370/393; 370/474; 709/247

(58) Field of Classification Search
 None
 See application file for complete search history.

(56) References Cited

U.S. PATENT DOCUMENTS

| | | | | |
|---|---|---|---|---|
| 2005/0008012 A1* | 1/2005 | Koren et al. | | 370/389 |
| 2005/0100051 A1* | 5/2005 | Kim et al. | | 370/477 |
| 2005/0160184 A1* | 7/2005 | Walsh et al. | | 709/247 |
| 2005/0175006 A1* | 8/2005 | Miyazaki et al. | | 370/389 |
| 2006/0233101 A1* | 10/2006 | Luft et al. | | 370/229 |
| 2008/0168560 A1* | 7/2008 | Durie et al. | | 726/23 |
| 2008/0279185 A1* | 11/2008 | Zhang et al. | | 370/392 |
| 2009/0042537 A1* | 2/2009 | Gelbman et al. | | 455/406 |
| 2010/0110915 A1* | 5/2010 | Mortensen et al. | | 370/252 |

FOREIGN PATENT DOCUMENTS

| | | |
|---|---|---|
| EP | 1564960 A1 | 8/2005 |
| JP | 2005-252855 A | 9/2005 |
| WO | 2006052183 A1 | 5/2006 |
| WO | 2007081727 A3 | 7/2007 |
| WO | 2007/120165 A2 | 10/2007 |

OTHER PUBLICATIONS

Ryoji Koike, US IT Trend, No. 31, DPI Technology and Next Generation Network—ISP Aiming for Service-Based Network Control—OPEN Enterprise Magazine, Socius Japan, vol. 5, No. 4, pp. 46-49, Apr. 2, 2007.
Translation of Japanese Notice of Rejection in corresponding Japanese Application No. 2010-548241 dated Oct. 23, 2012.

* cited by examiner

*Primary Examiner* — Khoa Huynh
(74) *Attorney, Agent, or Firm* — Kramer Amado, P.C.

(57) ABSTRACT

Various exemplary embodiments comprise a method and related device and computer-readable medium including one or more of the following: receiving an uncompressed packet sent from the source node to the destination node during a compression negotiation stage; storing information extracted from the uncompressed packet, the stored information sufficient to uniquely identify flows; receiving a compressed packet sent from the source node to the destination node; associating the compressed packet with an active flow by accessing the stored information and information in the compressed packet; performing deep packet inspection (DPI) to identify an application associated with the active flow; and performing application-specific processing on at least one packet belonging to the active flow. In various exemplary embodiments, the information extracted from the uncompressed packet includes a context identifier used to establish a compression context between a compressor and a decompressor.

17 Claims, 3 Drawing Sheets

COMPRESSED IP FLOW RECOGNITION FOR IN-LINE, INTEGRATED MOBILE DPI

BACKGROUND OF THE INVENTION

1. Field of the Invention

This invention relates generally to identification of IP flows in a network employing any form of Layer 3 or Layer 4 compression.

2. Description of Related Art

As the Internet has gradually become an integral part of everyday life, the number of Internet users has constantly increased. Recent estimates place the number of users worldwide at over one billion. To compound the problem, the Internet has also experienced a tremendous increase in the amount of traffic per user. As streaming video, peer-to-peer networking, and other high bandwidth applications become the norm, the burdens placed on the underlying network architecture increase exponentially. Consider, for example, the increase in bandwidth from the typical 56 kilobit/second modem used around ten years ago to an average 5 megabit/second DSL connection presently used. In less than ten years, the bandwidth of the average connection available to the end user has increased close to one hundred times.

Despite the massive increases in the amount of users and traffic, a slowing of the growth of the Internet does not appear to be in sight. In developing countries, Internet access is viewed as a sign of progress. On the other hand, for those who currently have access to the Internet, the reliance on the Internet is constantly increasing. For example, users often run web-based applications as a replacement for local applications or download high-quality movies rather than renting a DVD. Countless other uses of large amounts of bandwidth are available or currently being developed.

Although these signs of progress are encouraging to most, service providers face a difficult decision. When designing the congestion management systems, service providers did not contemplate the use of the Internet for streaming video, peer-to-peer applications, and other high bandwidth uses. As a result, when a large number of users run high-bandwidth applications, the best effort architecture frequently experiences congestion, thereby interfering with the user experience.

These problems are particularly salient in the context of mobile networks, where bandwidth is even more limited. Mobile networks are seeing a gradual transformation from voice-only services to data or mixed voice-data services. As per-user bandwidth requirements have increased, the burdens placed on the mobile network architecture have also increased.

Service providers, particularly mobile network service providers, must therefore decide between several options: continue providing best effort service; increase bandwidth and essentially become a transport "utility"; or sell application-specific services based on the requirements of the individual users. Service providers view the first two options as unsatisfactory, as users are dissatisfied with best effort service, while indiscriminately increasing bandwidth would result in additional costs to the service provider with no corresponding increase in revenue. Selling application-specified services, on the other hand, would allow users to pay for the services they desire to receive, while eliminating the need for the service provider to exponentially increase bandwidth.

In order to sell application-specific services, however, service providers must first modify the underlying network architecture to identify and gather information about applications. In the radio portion of mobile networks, the use of per-application traffic management is especially critical, as bandwidth is limited due to the inherent restrictions of radio frequencies. Consequently, mobile operators have started to deploy deep packet inspection (DPI) appliances to help identify applications not only for the purpose of billing, but also to perform traffic management based on the identified application.

In existing mobile network architectures, however, DPI elements are located such that they are unable to effectively manage radio frequencies, as information pertaining to the mobile base station is removed by the time the packets encounter the DPI element. In order to effectively monitor and manage per-application usage, DPI elements would need to be moved to a location in the network that provides visibility of both the end user and the mobile base station.

Placing the DPI elements in these locations, however, requires DPI elements to deal with mobility aspects of the network. More particularly, mobile networks utilize compression schemes to optimize data transmitted over the radio interface. While compression minimizes the amount of data sent over the radio portion of the network, it also removes IP flow information required by the DPI element to effectively identify applications and perform per-application processing.

Accordingly, there is a need for a device that identifies applications associated with data packets where the packet may be compressed. Furthermore, there is a need for an in-line device that identifies applications associated with data packets subject to a compression scheme, such as Robust Header Compression (ROHC) or Compressed Real-Time Transport Protocol (cRTP).

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

SUMMARY OF THE INVENTION

In light of the present need for compressed IP-flow recognition for in-line integrated mobile Deep Packet Inspection (DPI), a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

In various exemplary embodiments, a DPI device is placed in-line in a non-mobile portion of a mobile network, such that packets pass through the DPI device prior to being forwarded. Thus, in various exemplary embodiments, the DPI device identifies and classifies traffic passing through the mobile network based on information extracted from the header and/or data portion of the incoming packets. Using the information extracted from the packets, the DPI device may implement in-line policy enforcement to manage traffic based on the identified application, even though the DPI device is located in a user scope outside of the mobile portion of the network.

In-line placement of the DPI device in a mobile network, however, raises several problems. Mobile networks often use compression to minimize the use of limited bandwidth. More specifically, after establishing a flow between two nodes, the source node omits much of the packet header information to decrease the amount of transmitted data. For example, many compression schemes eliminate the source address, source port, destination address, and destination port, thereby making application identification and application-specific processing impossible at the DPI device. In order to properly function, however, the DPI device must associate every packet with a particular flow, not just the first packet. Thus, placing the DPI device in-line without modification of its functionality would fail to accomplish application-aware processing.

Accordingly, in various exemplary embodiments, a method of processing packets sent from a source node to a destination node and a related computer-readable medium encoded with instructions comprise: receiving an uncompressed packet sent from the source node to the destination node during a compression negotiation stage; storing information extracted from the uncompressed packet, the stored information sufficient to uniquely identify flows; receiving a compressed packet sent from the source node to the destination node; associating the compressed packet with an active flow by accessing the stored information; performing deep packet inspection (DPI) to identify an application associated with the active flow; and performing application-specific processing on at least one packet belonging to the active flow.

In various exemplary embodiments, the information extracted from the uncompressed packet comprises a context identifier used to establish a compression context between the source node and the destination node. Furthermore, in various exemplary embodiments, the information extracted from the uncompressed packet comprises at least one of a source address and a destination address extracted from a tunnel header used to forward the uncompressed packet from the source node to the destination node. In addition, in various exemplary embodiments, the information extracted from the uncompressed packet comprises at least one of a source IP address, source port number, destination IP address, destination port number, and protocol number.

In various exemplary embodiments, the application is selected from the group consisting of an email application, a web browser, a video application, an audio application, voice over IP, instant messaging, and a peer-to peer application. In various exemplary embodiments, the step of performing DPI to identify an application associated with the active flow comprises at least one of signature matching, pattern matching, stateful monitoring, behavioral analysis, and statistical analysis.

In various exemplary embodiments, the compressed packet is compressed using a compression scheme selected from the group consisting of ROHC, cRTP, VC, and IPHC. In various exemplary embodiments, the step of performing application-specific processing comprises performing a traffic management function on the at least one packet belonging to the active flow. Thus, in various exemplary embodiments, the traffic management function comprises modifying a quality of service associated with the at least one packet belonging to the active flow.

Furthermore, in various exemplary embodiments, a device for processing traffic in a network employing compression comprises: a communication module that receives an uncompressed and compressed packets sent from a source node to a destination node over an active IP flow; a storage device that stores information regarding packets; and a processor configured to identify an active IP flow associated with the compressed packet by accessing the information stored in the storage device and to perform deep packet inspection (DPI) to identify an application associated with the identified flow or any other type of application-specific processing. In various exemplary embodiments, the device is a standalone DPI device or is integrated into a router.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
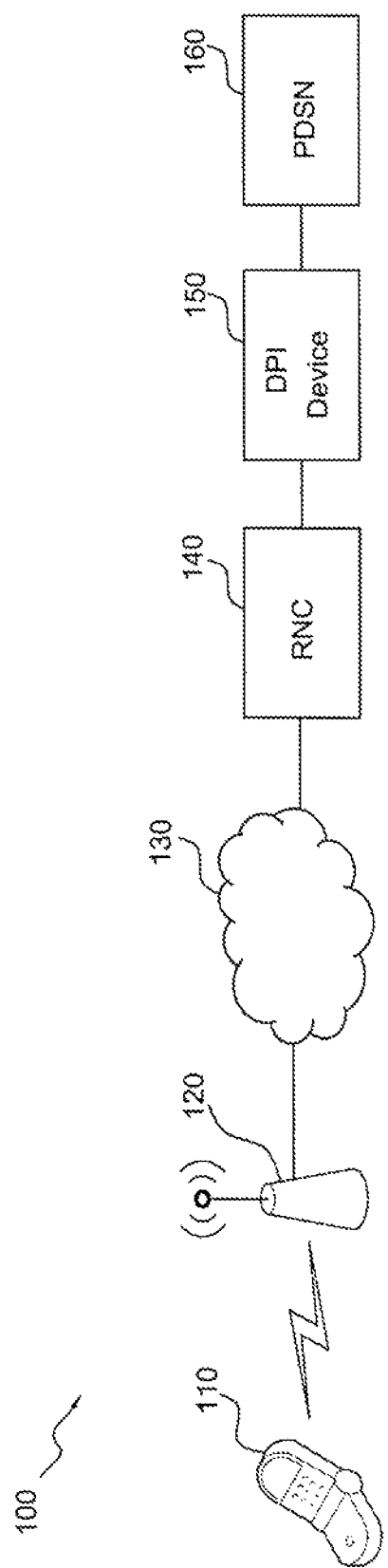
FIG. 1 is a schematic diagram of an exemplary mobile network utilizing in-line DPI in a mobile part of a network by identifying compressed flows.

Referring now to the drawings, in which like numerals refer to like components or steps, there are disclosed broad aspects of various exemplary embodiments.

FIG. 1 is a schematic diagram of an exemplary mobile network 100 utilizing in-line DPI in a mobile part of the network 100 by identifying compressed flows. Exemplary mobile network 100 includes user node 110, wireless base station 120, network 130, radio network controller 140, deep packet inspection device 150, and packet data serving node 160.

In various exemplary embodiments, user node 110 is a device operated by a user that enables access to mobile network 100. More specifically, in various exemplary embodiments, user node 110 is a cell phone, personal digital assistant, personal or laptop computer, wireless email device, or any other device that supports wireless communications. Furthermore, in various exemplary embodiments, user node 110 negotiates and performs header compression in conjunction with packet data serving node 160 to reduce the amount of data transferred over mobile network 100.

In various exemplary embodiments, wireless base station 120 is a device including an antenna to wirelessly exchange data with user node 110 over a plurality of radio channels. Furthermore, wireless base station 120 includes a wire line interface to forward data into network 130. Thus, in various exemplary embodiments, wireless base station 120 is a Node B in a 3G network or another base transceiver station communicating in a Global System for Mobile Communications (GSM), Universal Mobile Telecommunications System (UMTS), or other wireless network.

Additionally, in various exemplary embodiments, network 130 provides a connection between wireless base station 120 and radio network controller 140. It should be apparent that network 130 may be any network capable of sending data and requests between wireless base station 120 and radio network controller 140. Accordingly, network 130 may comprise a plurality of routers, switches, bridges, and other components suitable for receiving and forwarding data packets.

In various exemplary embodiments, radio network controller 140 controls and manages a plurality of wireless base stations 120. Thus, radio network controller 140 directs the transmission and reception of data in wireless base station 120 by controlling the radio transmitters and receivers in wireless base station 120. Furthermore, in various exemplary embodiments, radio network controller 140 receives and transmits packet-switched data between wireless base station 120 and packet data serving node 160. It should be apparent that radio network controller 140 may be replaced by a base station controller or another device capable of directing the operation of wireless base station 120 and receiving and transmitting data packets.

In addition, in various exemplary embodiments, mobile network 100 includes a deep packet inspection (DPI) device 150 that intercepts, "sniffs," or otherwise receives packets transmitted from radio network controller 140 to packet data switching node 160. More specifically, as described further below with reference to FIG. 5, DPI device 150 receives a packet, determines whether it is compressed or uncompressed, and performs processing according to that determination.

In various exemplary embodiments, DPI-device 150 comprises specialized hardware and/or software that is capable of examining data packets received from radio network controller 140 to identify information associated with the packets. Thus, in various exemplary embodiments, DPI device 150 includes a storage medium that stores information used to identify flows, a processor for performing analysis, and a communication module to receive and transmit packets.

In addition, in various exemplary embodiments, DPI device 150 is integrated into radio network controller 140, packet data switching node 160, or into a network element that is part of a network (not shown) providing connectivity between radio network controller 140 and packet data switching node 160. In various exemplary embodiments, the network providing connectivity comprises a plurality of routers, switches, bridges, and other components suitable for receiving and forwarding data packets. Alternatively, in various exemplary embodiments, DPI device 150 is placed or integrated into wireless base station 120 or a network element that is part of network 130.

In various exemplary embodiments, DPI device 150 examines any combination of information in layers 2 through 7 of the Open Systems Interconnection (OSI) model. Thus, in various exemplary embodiments, DPI device 150 performs a "deep" analysis of one or more packets in order to identify an application associated with the packets. For example, DPI device 150 may analyze a packet to determine whether the packet relates to email, streaming video, web browsing, peer-to-peer transfer, or any other application of interest to the service provider. Furthermore, in various exemplary embodiments, DPI device 150 performs traffic management operations, then forwards the packet to packet data serving node 160.

In various exemplary embodiments, packet data serving node 160 serves as a connection between mobile network 100 and one or more IP networks (not shown). Thus, in various exemplary embodiments, packet data serving node 160 forwards packets between the Internet and radio network controller 140. Furthermore, in various exemplary embodiments, packet data serving node 160 performs header decompression on compressed packets received from user node 110. It should be apparent that packet data serving node 160 may be replaced by a Gateway General Packet Radio Service Support Node (GGSN), a Serving Gateway General Packet Radio Service Support Node (SGSN), or any other node capable of providing a connection between mobile network 100 and an IP network.

It should be apparent that, although illustrated as a 3G wireless mobile network, network 100 may be any network that utilizes compression. Thus, in various exemplary embodiments, network 100 is a cellular network operating under a different standard, a satellite network, a wired network, or some other type of network utilizing compression between nodes.

Figure 2:
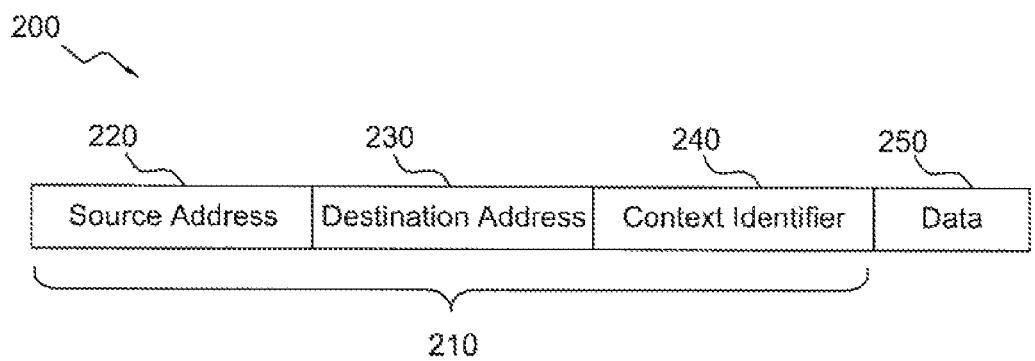
FIG. 2 is a schematic diagram of an exemplary uncompressed L3 packet.

FIG. 2 is a schematic diagram of an exemplary uncompressed packet 200. In various exemplary embodiments, uncompressed packet 200 includes, among others, packet header 210, source address 220, destination address 230, context identifier (ID) 240, and data 250.

In various exemplary embodiments, packet header 210 includes data used to forward uncompressed packet 200 from a source to a destination. Thus, in various exemplary embodiments, packet header 210 includes a source address field 220, which may include a source IP address and a source port. Furthermore, in various exemplary embodiments, packet header 210 includes destination address field 230, which may include a destination IP address and a destination port. Furthermore, packet header 210 includes context ID 240, which, in various exemplary embodiments, uniquely identifies a compression context between a compressor and a decompressor.

It should be apparent that packet header 210 is shown as including only source address field 220, destination address 230, and context ID 240 for the sake of simplicity. Thus, in various exemplary embodiments, packet header 210 includes additional fields including, but not limited to, a protocol number, traffic class, flow label, payload length, next header, and hop limit. Furthermore, it should be apparent that uncompressed packet 200 may be an IP packet, Transmission Control Protocol (TCP) packet, User Datagram Protocol (UDP) packet, or a packet formatted in any other protocol that may be subjected to compression.

Figure 3:
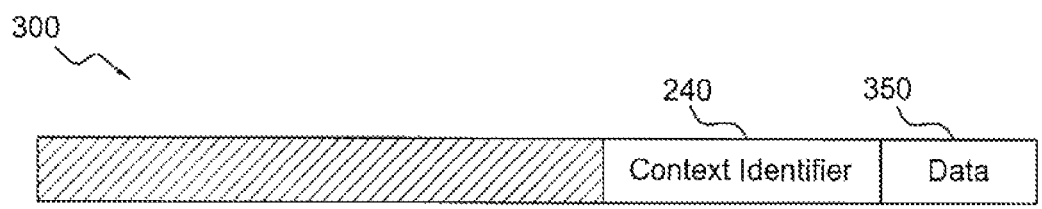
FIG. 3 is a schematic diagram of an exemplary compressed L3 packet.

FIG. 3 is a schematic diagram of an exemplary compressed packet 300. In various exemplary embodiments, compressed packet 300 includes only a context ID 240 and data 350. Thus, after a compressor and a decompressor negotiate a compression context, the compressor sends compressed packet 300 to minimize the amount of data transfer.

Figure 4:
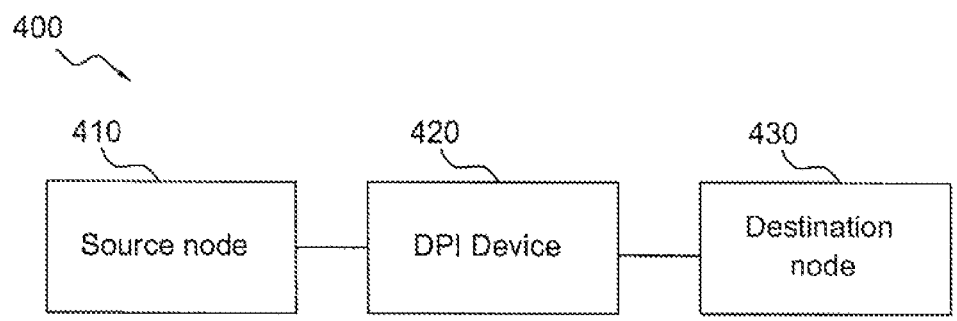
FIG. 4 is a schematic diagram of an exemplary system used to perform DPI on compressed L3 data packets.

FIG. 4 is a schematic diagram of an exemplary system 400 used to perform DPI on compressed data packets. Exemplary system 400 includes source node 410, DPI device 420, and destination node 430. It should be apparent that, in various exemplary embodiments, source node 410 sends packets to destination node 430 using any compression scheme including, but not limited to, ROHC, cRTP, Van Jacobson Header Compression (VC), and Internet Protocol Header Compression (IPHC).

In various exemplary embodiments, source node 410 forwards packets over a network to destination node 430. In various exemplary embodiments, source node 410 is a compressor used to compress packets sent to a decompressor. Thus, in various exemplary embodiments, source node 410 is a user node 110, radio network controller 140, packet data serving node 160, or any other node located in a position in the network where compression of outgoing packets would be advantageous. Alternatively, in various exemplary embodiments, source node 410 sends uncompressed packets, which are later received and compressed by a compressor.

In various exemplary embodiments, DPI device 420 is similar in structure and functionality to DPI device 150. Thus, in various exemplary embodiments, DPI device 420 intercepts, "sniffs," or otherwise receives packets transmitted from source node 410 to destination node 430. More specifically, as described further below with reference to FIG. 5, DPI device 420 receives a packet, determines whether it is compressed or uncompressed, and performs processing according to that determination.

It should be apparent, that although illustrated as a standalone device, in various exemplary embodiments, DPI device 420 is a component integrated into a router. Thus, in various exemplary embodiments, DPI device 420 analyzes each packet received by the router before the router forwards the packet to the next hop.

Furthermore, it should be apparent that DPI device 420 is illustrated as directly connected to source node 410 and destination 430 for the sake of simplicity. Accordingly, in various exemplary embodiments, one or more switches, routers, bridges, or other network elements are placed between DPI device 420 and source node 410 or destination node 430.

In various exemplary embodiments, destination node 430 receives packets from source node 410. In various exemplary embodiments, destination node 430 is a decompressor used to decompressor packets received from a compressor. Thus, in various exemplary embodiments, destination node 430 is a user node 110, radio network controller 140, packet data serving node 160, or any other node located in a position in the network where decompression of incoming packets is advantageous. Alternatively, in various exemplary embodiments, destination node 430 receives uncompressed packets, as the compressed packets may be processed by a decompressor prior to reaching destination node 430.

Figure 5:
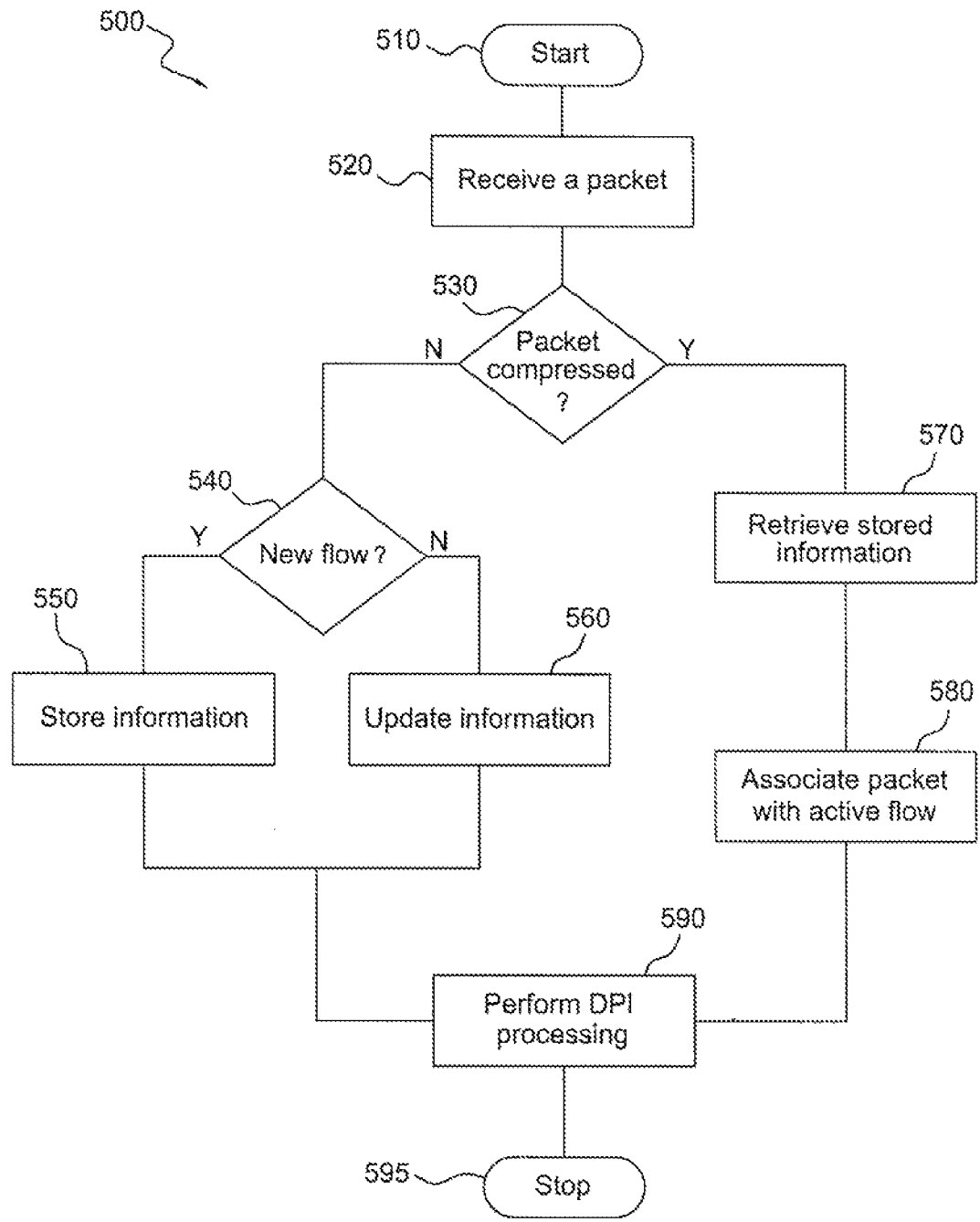
FIG. 5 is a flowchart of an exemplary embodiment of a method for compressed flow recognition for an in-line integrated DPI device.

FIG. 5 is a flowchart of an exemplary embodiment of a method 500 for compressed flow recognition for an in-line integrated DPI device 420. Exemplary method 500 starts in step 510 and proceeds to step 520, where DPI device 420 intercepts, sniffs, or otherwise receives a packet transmitted from source node 410 to destination node 430. Exemplary method 500 then proceeds to step 530, where DPI device 420 determines whether the packet is compressed.

When in step 530, it is determined that the packet is not compressed (i.e. uncompressed), exemplary method 500 proceeds to step 540, where it is determined whether uncompressed packet 200 is to be associated with a new flow. More particularly, DPI device 420 accesses information in the header of uncompressed packet 200 used to uniquely identify a flow and determines whether this information is stored in DPI device 420. Thus, in various exemplary embodiments, the information extracted from the header includes the source IP, source port number, destination IP, destination port number, and a protocol number.

When in step 540, it is determined that uncompressed packet 200 is to be associated with a new flow, exemplary method 500 proceeds to step 550. In step 550, DPI device 420 stores any information that will be used to associate packets received in the future with the identified flow.

More specifically, in step 550, DPI device 420 extracts context identifier 240 from uncompressed packet 200 and stores context identifier 240, such that DPI device may identify subsequently received data packets using the same context identifier 240. It should be apparent that, in various exemplary embodiments, context identifier 240 is sufficient to uniquely identify a flow between source node 410 and destination node 430. However, in various exemplary embodiments, additional information is necessary to uniquely identify each flow.

Thus, in various exemplary embodiments, DPI device 420 also gathers information from the tunnel header used to route packets from source node 410 to destination node 430. Thus, for example, this information may describe an L2 or L3 tunnel that carries the packet between radio network controller 140 and packet data switching node 160. In various exemplary embodiments, DPI device 420 extracts one or more fields from the tunnel header, such as the source IP address or destination IP address, and stores these fields in association with context identifier 240. Because the tunnel headers are not compressed, DPI device 420 will be able to gather this information from subsequent compressed packets transmitted from source node 410 to destination node 430. Thus, for example, DPI device 420 could extract the IP address of RNC 140 or PDSN 160 from the tunnel header to enable DPI device 420 to uniquely identify flows.

In various exemplary embodiments, DPI device 420 also stores information from the packet header of uncompressed packet 200. Thus, DPI device 420 may extract the source IP address, source port number, destination IP address, destination port number, and protocol number, and store this information in conjunction with the context ID and/or tunnel header information. Accordingly, in various exemplary embodiments, DPI device 420 may seamlessly process both compressed and uncompressed packets in a particular flow, as all information required to uniquely identify the flow is stored in DPI device 420.

It should be apparent that, in various exemplary embodiments, the information stored in step 550 in addition to context identifier 240 is not limited to tunnel headers and IP 5-tuple or 6-tuple data. Thus, in various exemplary embodiments, DPI device 420 stores any additional information that is sufficient to uniquely identify the compression context between a compressor and a decompressor.

On the other hand, when in step 540, it is determined that uncompressed packet 200 is not associated with a new flow (i.e. the packet is associated with an already identified flow), exemplary method 500 proceeds to step 560. In step 560, DPI device 420 updates any stored information that is used to uniquely identify the flow. More particularly, DPI device 420 updates any information that changed since it was initially stored in step 550.

On the other hand, when in step 530, it is determined that the packet is compressed, exemplary method 500 proceeds to step 570, where DPI device 420 retrieves information necessary to uniquely identify the flow. Thus, in various exemplary embodiments, DPI device 420 extracts context identifier 240 from compressed packet 300. In addition, DPI device 420 optionally extracts information from the tunnel header used to transmit compressed packet 300 from source node 410 to destination node 430 or any other information required to uniquely identify the flow. Exemplary method 500 then proceeds to step 580.

In step 580, DPI device 420 associates the packet with a previously identified flow based on the information extracted from compressed packet 300 and the information stored in DPI device 420. In various exemplary embodiments, context ID 240 is sufficient to uniquely identify a flow between source node 410 and destination node 430. Thus, in various exemplary embodiments, DPI device 420 associates the compressed packet 300 with a flow by comparing context ID 240 to the context ID information stored in DPI device 420.

Alternatively, in various exemplary embodiments, DPI device 420 must utilize additional information to uniquely identify the flow between source node 410 and destination node 430. More specifically, in various exemplary embodiments, DPI device 420 extracts one or more fields from the tunnel header of compressed packet 300, such as a source IP address or a destination IP address. DPI device 420 then associates the packet with the active flow by comparing the context ID 240 and information extracted from the tunnel header to the corresponding information stored in DPI device 420.

After storing information in step 550, updating information in step 560, or associating the packet with the active flow in step 580, exemplary method 500 proceeds to step 590, where DPI device 420 performs DPI processing based on the identified flow. Thus, in various exemplary embodiments, DPI device 420 examines any combination of information in OSI layers 3 through 7 of one or more packets to identify an application associated with the flow. For example, DPI device 420 may analyze one or more packets to determine whether the flow relates to email, streaming video, web browsing, peer-to-peer transfer, Voice over IP (VoIP), or any other application of interest to the service provider. In various exemplary embodiments, the analysis performed by DPI device 420 includes at least one of signature and pattern matching, stateful monitoring, behavioral analysis, and statistical analysis.

Furthermore, in various exemplary embodiments, DPI device 420 performs application-specific processing. In various exemplary embodiments, this application-specific processing includes traffic management operations. Accordingly, DPI device 420 may access a service level agreement associated with the subscriber located at source node 410 to determine how to treat packets in the identified flow. Based on this determination, DPI device 420 may associate a Quality of Service (QoS) marking with the packets, such as a Differentiated Services Code Point (DSCP).

For example, DPI device 420 may determine that the flow corresponds to streaming video and that the subscriber located at source node 410 has paid an additional fee to receive a high quality of service for such transfers. Accordingly, DPI device 420 may mark the packets with a higher DSCP value to indicate that the packets should be given high priority. Alternatively, DPI device 420 may determine that the flow is associated with a peer-to-peer transfer and that the subscriber is only paying for a base level of service. Accordingly, DPI device 420 may mark the packets in the flow with a value indicating that the packet should be given a lower priority.

It should be apparent that although described with reference to marking of packets, DPI device 420 may perform any application-specific processing. Thus, in addition to QoS processing, DPI device 420 may, for example, drop packets, collect statistics, and manage billing. After performing DPI processing in step 590, exemplary method 500 proceeds to step 595, where exemplary method 500 stops.

According to the forgoing, various exemplary embodiments include a DPI device that identifies and analyzes a flow, even when packets in the flow are subjected to a compression algorithm. More specifically, in various exemplary embodiments, the DPI device stores information included in an uncompressed packet and utilizes this information to identify subsequently received compressed packets associated with the flow. Based on the flow identification, the DPI device examines packets in the flow, identifies a corresponding application, and performs application-specific processing.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of processing packets sent from a source node to a destination node with a Deep Packet Inspection (DPI) device comprising a storage device, a processor, and a communication module, the method comprising:
   receiving, in the communication module, an uncompressed packet sent from the source node to the destination node during a compression negotiation stage;
   storing, in the storage device, information extracted from the uncompressed packet, the stored information being sufficient to uniquely identify flows and containing at least a context identifier (ID) that uniquely identifies a compression context between the source node and the destination node;
   receiving, in the communication module, at least one subsequent compressed packet sent from the source node to the destination node, wherein the at least one subsequent compressed packet comprises information including at least the context ID;
   associating, with the processor, the at least one subsequent compressed packet with an active flow by accessing the stored information and the information in the at least one subsequent compressed packet;
   performing, with the processor based on the associating step, DPI to identify an application associated with the active flow, wherein the DPI device stores the context ID; and
   performing application-specific processing on at least one packet belonging to the active flow.

2. The method of claim 1, wherein the information extracted from the uncompressed packet comprises the context ID used to uniquely identify the compression context between the source node and the destination node.

3. The method of claim 2, wherein the source node is a compressor.

4. The method of claim 2, wherein the destination node is a decompressor.

5. The method of claim 1, wherein the information extracted from the uncompressed packet comprises at least one of a source address and a destination address extracted from a tunnel header used to forward the uncompressed packet along a path from the source node to the destination node.

6. The method of claim 1, wherein the information extracted from the uncompressed packet comprises at least one of a source Internet Protocol (IP) address, source port number, destination IP address, destination port number, and protocol number.

7. The method of claim 1, wherein the step of performing DPI to identify an application associated with the active flow further comprises:
   at least one of signature matching, pattern matching, stateful monitoring, behavioral analysis, and statistical analysis.

8. The method of claim 1, further comprising:
   compressing the compressed packet using a compression scheme selected from the group consisting of Robust Header Compression (ROHC), compressed Realtime Control Protocol (cRTP), Van Jacobson Header Compression, and Internet Protocol Header Compression.

9. The method of claim 1, wherein the step of performing application-specific processing comprises:
performing a traffic management function on the at least one packet belonging to the active flow.

10. The method of claim 9, further comprising:
modifying a quality of service associated with the at least one packet belonging to the active flow.

11. A deep packet inspection (DPI) device for processing traffic in a network employing compression, the DPI device comprising:
a communication module that receives an uncompressed packet and at least one subsequent compressed packet sent from a source node to a destination node over an active flow;
a storage device that stores information extracted from the uncompressed packet, wherein the stored information comprises at least a context identifier (ID) that uniquely identifies a compression context between a compressor and a decompressor; and
a processor configured to [identify the active flow associated with the at least one subsequent compressed packet by accessing the information stored in the storage device and information contained in the at least one subsequent compressed packet, wherein the compressed packet comprises the context ID, and perform DPI to identify an application associated with the identified flow, wherein the DPI device stores the context ID that uniquely identifies a compression context between a compressor and a decompressor.

12. The device of claim 11, wherein the device is a standalone device.

13. The device of claim 11, wherein the device is integrated into a network element selected from the group consisting of a router, a radio network controller, and a packet data serving node.

14. The device of claim 11, wherein the information extracted from the uncompressed packet comprises the context ID used to establish the compression context between the compressor and the decompressor.

15. The device of claim 11, wherein the information extracted from the uncompressed packet comprises at least one of a source address and a destination address extracted from a tunnel header used to forward the uncompressed packet along a path from the source node to the destination node.

16. The device of claim 11, wherein the information extracted from the uncompressed packet comprises at least one of a source Internet Protocol (IP) address, source port number, destination IP address, destination port number, and protocol number.

17. The device of claim 11, wherein the compressed packet is compressed using a compression scheme selected from the group consisting of Robust Header Compression (ROHC), compressed Realtime Control Protocol (cRTP), Van Jacobson Header Compression, and Internet Protocol Header Compression.

* * * * *